Sept. 9, 1941. W. S. DIEHL 2,255,046
SEAPLANE WING FLOAT
Filed Oct. 16, 1939
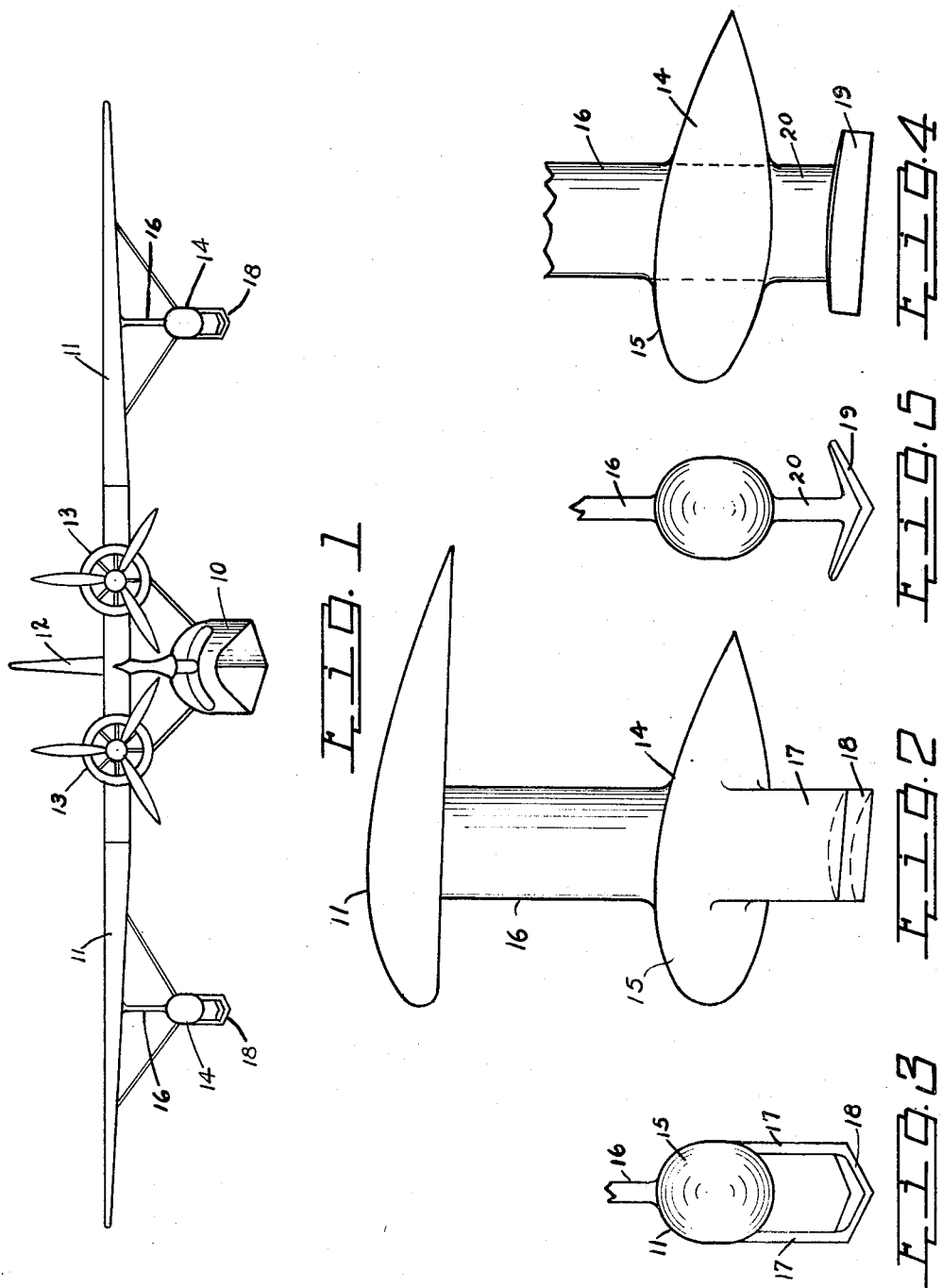
INVENTOR
WALTER S. DIEHL
BY
ATTORNEY Patented Sept. 9, 1941

2,255,046

UNITED STATES PATENT OFFICE 2,255,046

SEAPLANE WING FLOAT

Walter S. Diehl, United States Navy

Application October 16, 1939, Serial No. 299,705

3 Claims. (Cl. 244—106)

(Granted under the act of March 3, 1883, as
amended April 30, 1928; 370 O. G. 757)

The present invention relates to seaplane wing floats and it has a particular relation to floats designed to provide the desired buoyancy and lateral stability when the seaplane is afloat and at the same time provide a planing surface to aid in taking off from and alighting on the water. Heretofore, when these floats were shaped to give the necessary planing characteristics, the configuration was such as to also give a high air resistance. Attempts made to improve on one of these requirements, that is to say maximum planing characteristics and minimum air resistance, resulted in an impairment of the other.

The principal object of the present invention is the provision of a seaplane wing float having a streamlined configuration so as to reduce air resistance to a minimum, and provided with a planing surface or hydrofoil located beneath the float and spaced therefrom so as not to interfere with the air flow of the latter.

With this and other objects in view, as well as other advantages that may be incident to the use of the improvement, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

Fig. 1 is a front elevational view of a seaplane equipped with wing floats constructed in accordance with the invention;

Fig. 2 is a transverse vertical sectional view on a larger scale through a wing of the seaplane showing the wing float in side elevation;

Fig. 3 is a front elevational view of the float structure shown in Fig. 2;

Fig. 4 is a side elevational view of a float construction embodying another form of the invention; and Fig. 5 is a front elevational view of the float shown in Fig. 4.

Referring to the drawing and particularly to Fig. 1 thereof, a seaplane embodying wing floats constructed in accordance with the present invention is shown as comprising in general a fuselage or cabin 10, wings 11, tail 12, propeller and engine assemblies 13, and wing floats 14.

Each of the floats 14 comprises a main body portion or displacement element 15 of streamlined shape which is secured to the lower surface of the wing 11 by struts 16 at points well outboard of the fuselage and above the waterline. Secured beneath each of the floats 14 by parallel struts 17 is a hydrofoil 18 having a flattened V-shape cross section. This hydrofoil is spaced from the float a distance equal to the chord of the planing surface of the hydrofoil, that is to say the fore and aft dimension thereof as shown in Fig. 2 and is located a slight distance above the water line of the fuselage when the seaplane is riding on an even keel. The hydrofoil, however, is submerged when the plane is listing to port or starboard and the float 14 is supporting the wing, as is normally the case when the seaplane is not in motion.

The float 14 is mounted with respect to the wing so as to have its minimum air drag occur at or near the angle of attack for high speeds. The hydrofoils are so set with respect to the wing that they develop good dynamic action at normal planing angles. In general, this means that the hydrofoil should be set at about the same angle as the wing, or slightly greater, when the trim angles are under control.

The advantages of this arrangement are reduced air drag, better handling in rough water, since the float or displacement element can be placed well clear of the normal water line. Also, the float 14 may be of lighter weight, since it carries no dynamic loads when the seaplane is in motion under power.

In Figs. 4 and 5 there is shown a slightly different form of the invention wherein a hydrofoil 19 is secured to the float by a single centrally disposed strut 20. In other respects, the construction and function are the same as in the structure previously described.

It will be understood that the above description and accompanying drawing comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United State of America for governmental purposes without the payment of any royalties thereon or therefor.

I claim:

1. In a seaplane having a buoyant fuselage and wings extending therefrom, a stabilizing float of streamline configuration mounted beneath each of said wings outboard of said fuselage, and a hydrofoil disposed beneath each of said floats above the normal water level of said fuselage when on even keel, and spaced from said float a distance substantially equal to the chord of the planing surface of said hydrofoil.

2. In a seaplane having a buoyant fuselage and wings extending therefrom, a stabilizing float of streamline configuration mounted beneath each of said wings outboard of said fuselage, and a hydrofoil of substantially V-shape in transverse section disposed beneath each of said floats above the normal water level of said fuselage when on even keel, and spaced from said float a distance substantially equal to the chord of the planing surface of said hydrofoil.

3. In a seaplane having a buoyant fuselage and wings extending therefrom, a stabilizing float of streamline configuration mounted beneath each of said wings outboard of said fuselage, and a hydrofoil disposed beneath each of said floats above the normal water level of said fuselage when on even keel, and laterally spaced parallel struts connecting said hydrofoil to said float at a distance therefrom substantially equal to the chord of the planing surface of said hydrofoil.

WALTER S. DIEHL.